(12) United States Patent
Lepper

(10) Patent No.: US 9,303,672 B2
(45) Date of Patent: Apr. 5, 2016

(54) RIVET FASTENER

(75) Inventor: Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 147 days.

(21) Appl. No.: 13/994,537

(22) PCT Filed: Dec. 12, 2011

(86) PCT No.: PCT/US2011/064447
§ 371 (c)(1),
(2), (4) Date: Jun. 14, 2013

(87) PCT Pub. No.: WO2012/082636
PCT Pub. Date: Jun. 21, 2012

(65) Prior Publication Data
US 2013/0280005 A1  Oct. 24, 2013

Related U.S. Application Data

(60) Provisional application No. 61/422,890, filed on Dec. 14, 2010.

(51) Int. Cl.
*F16B 19/10* (2006.01)
*B60R 13/02* (2006.01)

(52) U.S. Cl.
CPC ......... *F16B 19/1027* (2013.01); *B60R 13/0206* (2013.01); *F16B 19/1081* (2013.01)

(58) Field of Classification Search
CPC .................................................. F16B 19/1081
USPC ........................... 411/41, 45–48, 409; 24/297
See application file for complete search history.

(56) References Cited

U.S. PATENT DOCUMENTS

| 3,481,242 | A   | * | 12/1969 | Topf ............................ 411/502 |
| 5,568,675 | A   | * | 10/1996 | Asami et al. .................... 24/453 |
| 5,632,581 | A   | * | 5/1997  | Hasada .......................... 411/48 |
| 7,837,225 | B2  | * | 11/2010 | Gosis et al. .................... 280/730.2 |
| 2005/0002759 | A1 | * | 1/2005 | Pares Isanta ................. 411/501 |
| 2006/0171793 | A1 |   | 8/2006 | Kawai et al. |
| 2008/0014045 | A1 |   | 1/2008 | Kawai |
| 2008/0031701 | A1 |   | 2/2008 | Boubtane et al. |
| 2009/0056087 | A1 |   | 3/2009 | Arisaka |

FOREIGN PATENT DOCUMENTS

| CN | 2285846 Y    | 7/1998 |
| EP | 1878925 A2   | 11/2007 |
| WO | 2006081261 A2 | 8/2006 |

OTHER PUBLICATIONS

ISR and Written Opinion for PCT/US2011/064447 dated Mar. 20, 2012.

* cited by examiner

*Primary Examiner* — Flemming Saether

(57) ABSTRACT

A rivet fastener includes a fastener body and a fastener pin which is inserted into the fastener body. A head of the fastener body defines a channel for receiving a head of the fastener pin, with lateral lands of the fastener body head exposed outwardly of sides of the fastener pin head. The exposed surface of the fastener body head defines hollows or recesses to accommodate tips of fingers of an installer.

15 Claims, 4 Drawing Sheets

US 9,303,672 B2

RIVET FASTENER

CROSS-REFERENCE TO RELATED APPLICATIONS

The present application is a National Phase of International Application Number PCT/US2011/064447, filed Dec. 12, 2011, and claims the benefit of U.S. application 61/422,890 filed Dec. 14, 2010.

FIELD OF THE INVENTION

The present invention relates generally to fasteners, and more particularly to plastic, rivet-type fasteners used for securing articles to supporting structures, such as, for example, the fasteners used in the automotive industry to secure interior panels, interior and exterior molding and trim, and the like.

BACKGROUND OF THE INVENTION

A basic design for a rivet-type fastener includes a body that is inserted into aligned openings in first and second articles. The fastener body includes a collar or head larger than the openings in the articles, and deflectable portions that yield as the body is inserted through the openings and rebound when fully through the openings. The articles to be secured by the fastener are sandwiched between the collar and the rebounded deflectable portions. A pin of the fastener is inserted into and retained by the body after the body is seated in place in the articles. The pin wedges against the deflectable portions of the body to secure the body in place, and may include still further deflectable elements to increase the retention force of the fastener. Fasteners of this type have been used advantageously and are accepted in many applications. However, such fasteners are not without inadequacies and deficiencies for some uses and applications.

In some known rivet fasteners the body and pin are independent components, completely separate from one another before installation. In other known rivet fasteners, the body and pin having a preinstalled position in which the pin is held in the body but does not interfere with installation of the body in a work piece. After the body is inserted, the pin is driven into its final position. For many applications and uses, rivet fasteners of this basic type provide few difficulties. The body is first inserted and seated in place by pushing on the head of the body. Once the body is fully seated, the pin is inserted and the head of the pin is pushed until the pin two is fully seated in the body. It is known to provide the head of the body and the head of the pin of substantially the same size. It is also known in some applications to provide the fastener in a channel or in a shallow well or cavity to conceal and/or protect the heads of the body and the pin. While the channel or well is of sufficient size to receive the heads it can be sometimes cumbersome to manipulate the pin for insertion into the recessed head of the body. Particularly when the fastener is relatively short so that the shank of the pin is relatively short an installer attempting to position the pin in the body can be hindered by the edge of the channel or well in which the fastener is positioned. This can substantially slow installation if the pin is dropped and a second pin must be obtained or the first pin found before installation can be completed.

Accordingly, it is desirable and advantageous to provide a rivet fastener including a body and pin that are more easily manipulated within a restricted installation area.

SUMMARY OF THE INVENTION

The present invention addresses problems of other designs by providing a narrow grip between sides on the head of the pin in a rivet fastener having a pin and fastener body. A head of the body includes a channel for receiving the narrowed head of the pin, and the head of the body includes outer surface hollows laterally of the channel allowing the fingertips of an installer better access for inserting the pin into the body.

Advantages of at least some forms of the rivet fastener disclosed herein are that the rivet fastener is easier to handle and install, particularly in recessed cavities.

Other features and advantages of the invention will become apparent to those skilled in the art upon review of the following detailed description, claims and drawings in which like numerals are used to designate like features.

Figure 1:
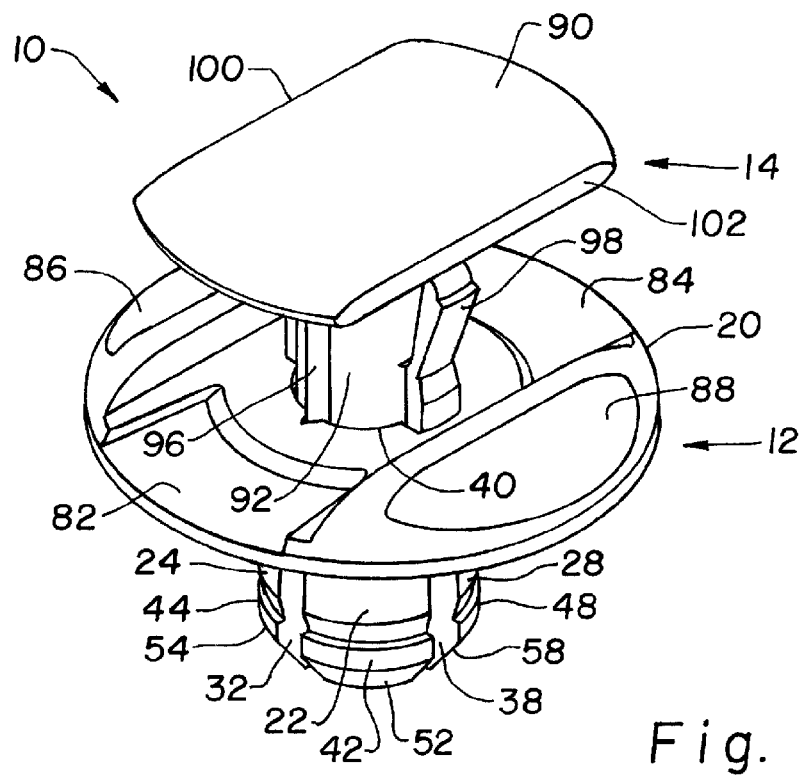
FIG. 1 is a perspective view of a rivet fastener in a preinstalled condition.
Figure 2:
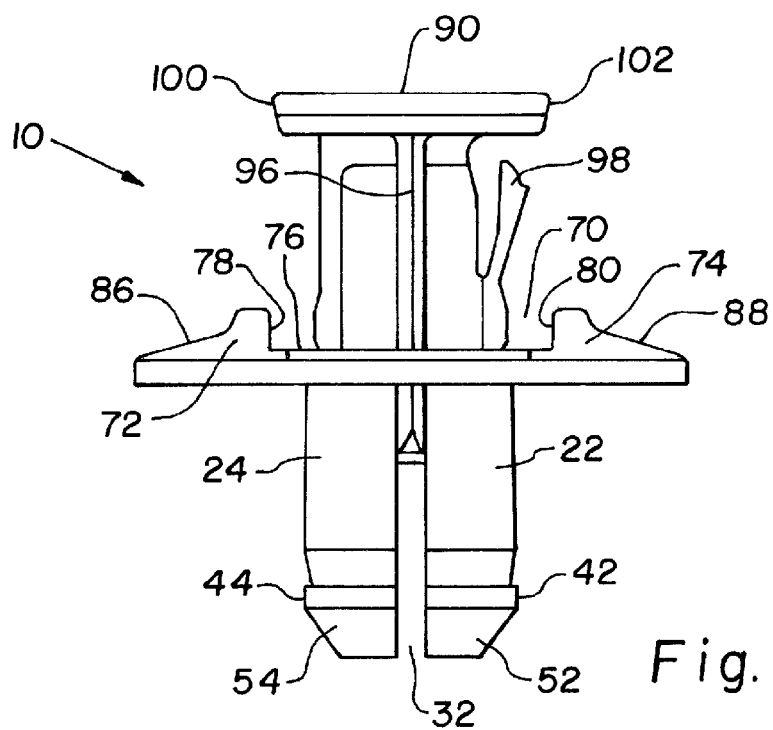
FIG. 2 is an elevational view of the rivet fastener in the preinstalled condition.
Figure 3:
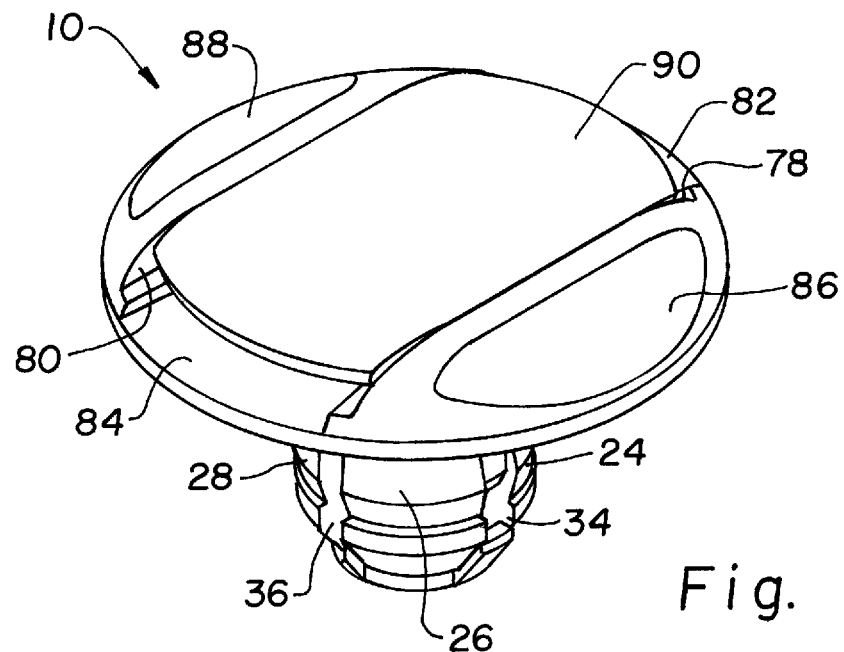
FIG. 3 is a perspective view of the rivet fastener in its fully installed condition, showing the rivet fastener rotated about 180° from the view of FIG. 1.
Figure 4:
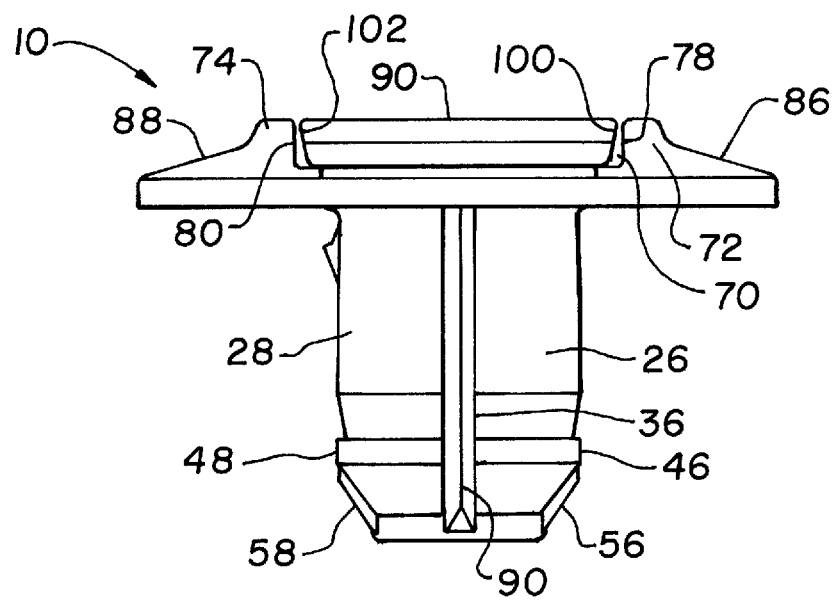
FIG. 4 is an elevational view of the rivet fastener in the fully installed condition but with the fastener rotated 180° from the view of FIG. 2.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, an exemplary rivet fastener 10 is shown. Fastener 10 includes a fastener body 12 and a fastener pin 14. Fastener body 12 is configured to seat within holes in articles to be fastened together by rivet fastener 10. Fastener pin 14 is configured for insertion into fastener body 12 to inhibit fastener body 12 from dislodging from the articles in which it is seated. Fastener body 12 and fastener pin 14 can be made of plastic by various molding techniques, and can be formed from the same or different materials.

Fastener body 12 includes a body head 20 and legs 22, 24, 26, 28 extending substantially axially from one side of body head 20. In the exemplary embodiment shown, legs 22, 24, 26, 28 are independent and spaced one from the other except for the mutual connection thereof to one side of body head 20. Accordingly, elongated spaces 32, 34, 36, 38 are defined between adjacent legs 22, 24, 26, 28, and collectively join into an open space centrally located between legs 22, 24, 26, 28. Body head 20 defines a central opening 40 therethrough.

Each of legs 22, 24, 26, 28 includes a substantially smooth outer axial extent from body head 20 and a somewhat enlarged end 42, 44, 46, 48 including tapered distal segments 52, 54, 56, 58, respectively. Tapered distal segments 52, 54, 56, 58 provide an entrance end that is more narrow than the diameters of holes in the articles in which the fastener is to be installed. Accordingly, fastener body 12 can be positioned easily in a hole, and by applying axial force against body head 20, legs 22, 24, 26, 28 can be forcibly inserted into the aligned holes of the articles. Tapered distal segments 52, 54, 56, 58 slide against the edges of the holes such that legs 22, 24, 26, 28 can be deflected inwardly so that enlarged ends 42, 44, 46, 48 can pass through the holes even though the enlarged ends 42, 44, 46, 48 define an outer dimension that is larger than the diameters of the holes. After enlarged ends 42, 44, 46, 48 have passed through the holes in the articles, legs 22, 24, 26, 28 can again rebound outwardly so that the article or articles to be held by rivet fastener 10 are held between the underside of body head 12 and the proximal side of enlarged ends 42, 44, 46, 48.

The form of fastener body 12 as just described is exemplary only, and the invention can be used with other types of bodies. For example and not limitation, the legs of the body can be connected one to another such as at a distal end cap. By way of further example and not limitation, more than four legs or fewer then four legs can be used, as well as legs of other shapes and/or configurations.

Body head 20 in the exemplary embodiment defines a substantially circular perimeter, but also can be of other shapes. In the outer surface thereof relative to its installation, that is the surface opposite the surface from which legs 22, 24, 26, 28 extend, body head 20 defines an elongated channel 70 extending substantially between diametrically opposite edge portions of body head 20. Channel 70 is longer than it is wide so that body head 20 defines lateral lands 72, 74 along opposite sides of channel 70. Channel 70 is defined by a bottom 76 and channel side walls 78, 80. In this exemplary embodiment, channel side walls 78, 80 are substantially flat; however, other shapes and configurations also can be used. Channel bottom 76 has relief areas 82, 84 at opposite ends thereof.

Each of lands 72, 74 is relieved along its upper surface and defines a thickness along channels 70 that is greater than a thickness more distant from channel 70. Accordingly, hollows or recesses 86, 88 are provided in lands 72, 74, respectively.

Fastener pin 14 includes a pin head 90 and a shaft 92 extending axially from pin head 90. Shaft 92 is configured for insertion through central opening 40 of body head 20 to be received between legs 22, 24, 26, 28. Shaft 92 can include one or more elongated ridge 94, 96 and/or other features or configurations to fit within one or more of spaces 32, 34, 36, 38. For example and not limitation, shaft 92 also can include a springing latch element 98 for further securing the position of fastener pin 14 within fastener body 12. Central opening 40 within body head 20 can be shaped to accommodate ridges 64, 66 and any other shaped external features or configurations of shaft 92.

Pin head 90 is of a shape and size to fit within channel 70. Accordingly, pin head 90 has a length greater than its width so as to substantially fill channel 70 from near one end thereof to near the other end thereof and to fit snugly between lands 72, 74. Pin head 90 has substantially flat sides 100, 102 between which the narrowed width of pin head 90 is defined. The thickness of pin head 90 is such as to fit smoothly within channel 70, without projecting above lands 72, 74 to thereby provide a smooth exposed surface in a fully installed condition of rivet fastener 10. Accordingly, the thickness profile of pin head 90 substantially conforms to the height profiles of the sidewalls 78, 80.

Figure 5:
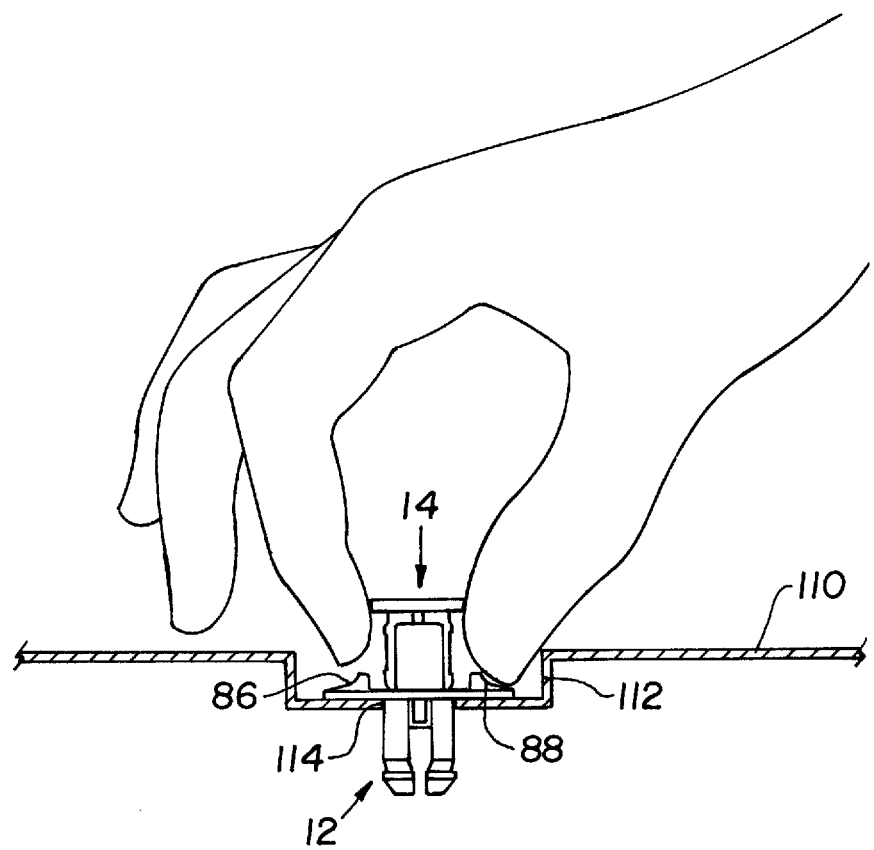
FIG. 5 is an elevational view illustrating installation of a rivet fastener.

FIG. 5 illustrates the installation of rivet fastener 10 in a structure 110. It should be understood that structure 110 can be a single object, such as a panel or piece of automobile trim molding, for example and not limitation, or can be multiple objects to be held together. Structure 110 defines a well or cavity 112 which can be a groove or channel or a discrete area not significantly larger then body head 20. Well 112 defines a hole 114 in the bottom thereof through which fastener body 12 is installed. As described previously, legs 22, 24, 26, 28 are inserted through hole 114 until body head 20 and rests against the bottom of well 112.

Fastener pin 14 is installed into fastener body 12 to secure the position of fastener body 12 within structure 110. As those skilled in the art will understand, fastener pin 14 may have one or several intermediate installation positions relative to fastener body 12 such that fastener body 12 and fastener pin 14 can be preassembled and installed as a unit within structure 110 but without fastener pin 14 in its fully installed position. For final installation of fastener pin 14 within faster body 12, shaft is inserted through opening 40 and pushed axially so that shaft 92 extends into the area between legs 22, 24, 26, 28 including the positioning of ridges 94, 96 and any other features or structures within spaces 32, 34, 36, 38. In a fully installed condition pin head 90 settles into channel 70.

Rivet fastener 10 provides several advantages for handling and installation. The substantially rectangular shape and flat sides of pin head 90 facilitate handling by allowing secure grasping of the pin in a pinched manner between a thumb and forefinger of an installer. As installation of fastener pin 14 within fastener body 12 progresses, hollows or recesses 86, 88 and accommodate the tips of the thumb and/or fingers of the installer. In the fully installed condition portions of body head 20 remain exposed, that is, the upper surfaces of lateral lands 72, 74 outwardly of channel 70. Accordingly, force can be applied directly against fastener body 12 to ensure that it is fully seated, even when fastener pin 14 is either partially or fully installed within fastener body 12. If fastener pin 14 has a preinstalled position within fastener body 12 such that the preassembled unit of fastener body 12 and fastener pin 14 is then installed in a structure 110, force can be applied to fastener body 12 along lateral lands 72, 74 to fully seat fastener body 12 within structure 110 without simultaneously applying force on fastener pin 14. Accordingly, full seating of fastener body 12 within structure 110 can be achieved without changing the position of fastener pin 14 relative to faster body 12 when fastener body 12 and fastener pin 14 have a preinstalled condition in which fastener pin 14 is partly inserted into fastener body 12.

Relief areas 82, 84 can accommodate the insertion of a pry tool such as a screwdriver or the like between pin head 90 and body head 20 if it becomes necessary to remove fastener pin 14 from fastener body 12.

Figure 6:
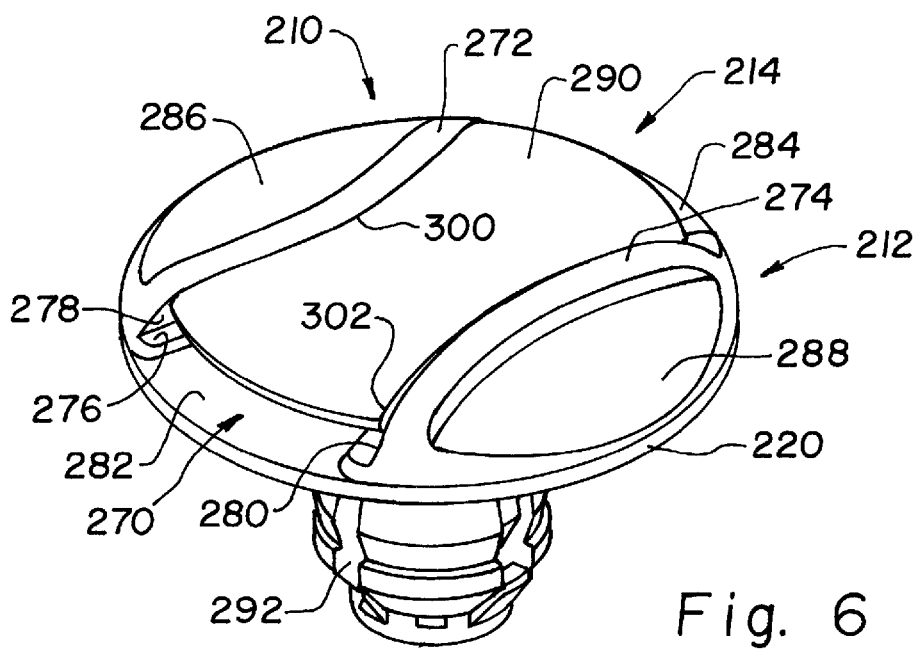
FIG. 6 is a perspective view of another embodiment of a rivet fastener.
Figure 7:
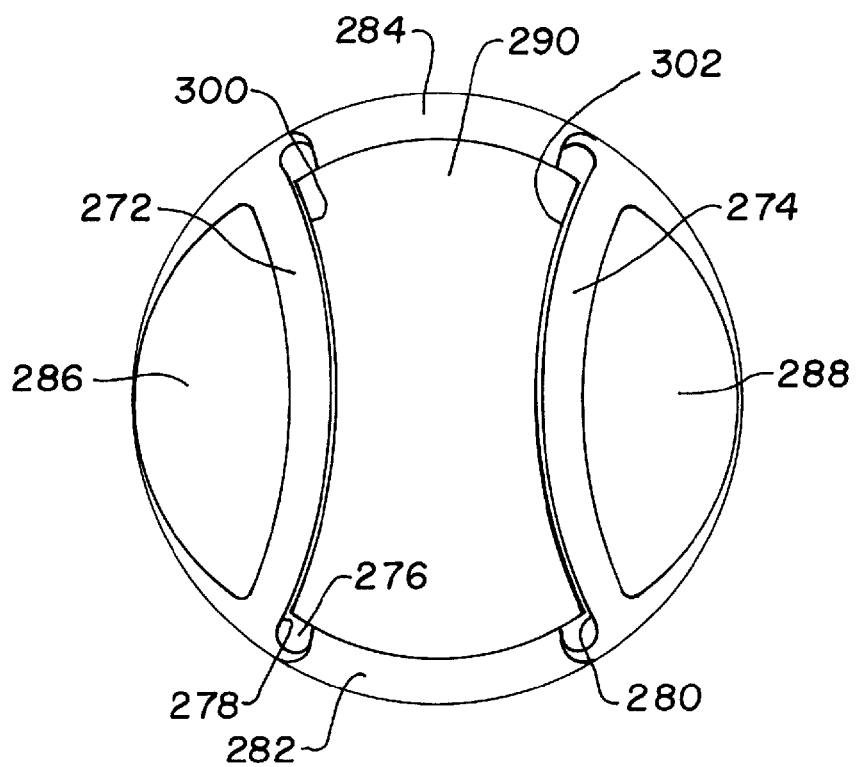
FIG. 7 is a plan view of the top of the rivet fastener shown in FIG. 6.

Another embodiment for a rivet fastener 210 is shown in FIGS. 6 and 7. Fastener 210 includes a fastener body 212 and a fastener pin 214. Fastener body 212 is configured to seat within holes in articles to be fastened together by rivet fastener 210, similarly to that described previously for fastener body 12. Fastener pin 214 is configured for insertion into fastener body 212 to inhibit fastener body 212 from dislodging from the articles in which it is seated, as described previously with respect to the first embodiment of fastener pin 14 in fastener body 12. Fastener body 212 and fastener pin 214 can be made of plastic by various molding techniques, and can be formed from the same or different materials.

Fastener body 212 and fastener pin 214 are similar to fastener body 12 and fastener pin 14 described previously herein except for changes in the complementary shapes of a fastener body head 220 and fastener pin head a 290 thereof.

Body head 220 in this exemplary embodiment defines a substantially circular perimeter, but also can be of other shapes. In the outer surface thereof, body head 220 defines an elongated channel 270 extending substantially between diametrically opposite edge portions of body head 220. Channel 270 is longer than it is wide so that body head 220 defines lateral lands 272, 274 along opposite sides of channel 270. Channel 270 is defined by a bottom 276 and channel side walls 278, 280. Channel bottom 276 has relief areas 282, 284 at opposite ends thereof. Unlike channel side walls 78, 80 described previously, which are substantially straight, channel side walls 278, 280 are curved, bowing inwardly in channel 270 so that channel 270 is wider near the ends thereof than at the center thereof.

Each of lateral lands 272, 274 is relieved along its upper surface and defines a thickness along channels 270 that is greater than a thickness more distant from channel 270. Accordingly, hollows or recesses 286, 288 are provided in lands 272, 274, respectively.

Fastener pin 214 includes a pin head 290 and a shaft 292 extending axially from pin head 290. Shaft 292 is configured similarly to shaft 92 described previously, and is therefore configured for insertion into fastener body 212.

Pin head 290 is of a shape and size to fit within channel 270. Accordingly, pin head 290 has a length greater than its width so as to substantially fill channel 270 from near one end thereof to near the other end thereof and to fit snugly between lands 272, 274. Pin head 290 has generally concave sides 300, 302 between which the narrowed width of pin head 290 is defined. The thickness of pin head 290 is such as to fit smoothly within channel 270, without projecting above lands 272, 274 to thereby provide a smooth exposed surface in a fully installed condition of rivet fastener 210. Accordingly, the thickness profile of pin head 290 substantially conforms to the height profiles of the sidewalls 278, 280. Concave sides 300, 302 provide surfaces easily gripped by an installer.

Rivet fastener 210 is used similarly to the manner of use described previously herein for rivet fastener 10. The features and advantages described for rivet fastener 10 are found also in rivet fastener 210. Concave sides 300, 302 of pin head 290 may make pin head 290 even more securely gripped.

Still other variations also are foreseen. For example and not limitation, sides 100, 102, 300, 302 can be provided with stippling, serrations or other surface treatments to improve gripping pin heads 90, 290 by installers.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A rivet fastener, comprising:
a fastener body having a body head defining a hole therethrough;
a fastener pin having a pin head and a shaft configured for insertion through said hole in said body head;
said body head defining a channel in a surface thereof, and lands along opposite edges of said channel;
said pin head being of a size and shape to fit within said channel while leaving said lands exposed along side said pin head; and
said lands being relieved along upper surfaces thereof and defining continuous unobstructed fingertip accommodating hollows in exposed surfaces thereof outwardly from and continuously along said channel for the lengths of said lands along said channel.

2. The rivet fastener of claim 1, said pin head having flat sides.

3. The rivet fastener of claim 2, said body head having a relief area along at least one end of said channel.

4. The rivet fastener of claim 2, said channel defined by a channel bottom and channel side walls, and said pin head having a thickness profile corresponding to a height profile of said channel side walls.

5. The rivet fastener of claim 1, said body head defining a substantially round perimeter, and said channel extending diametrically through a surface of said body head.

6. The rivet fastener of claim 5, said pin head having elongated, flat parallel sides.

7. The rivet fastener of claim 1, said body head defining a substantially round perimeter; said channel extending diametrically through an upper surface of said body head; said channel defined by a channel bottom and channel side walls, and said pin head having a thickness profile corresponding to height profiles of said channel side walls.

8. The rivet fastener of claim 7, said channel bottom having a relief area inwardly from at least one end of said channel.

9. A rivet fastener, comprising:
a fastener body having a body head defining a channel in an outer surface thereof, and lands positioned adjacent said channel;
a fastener pin insertable into said body, said pin having a pin head and a shaft;
said pin head being of a size and shape to fit within said channel while leaving said lands exposed adjacent said pin head; and
said lands being relieved in exposed surfaces thereof and defining continuous unobstructed fingertip accommodating hollows in said exposed surfaces thereof outwardly from and continuously along said channel, said hollows being continuous and unobstructed for the lengths of said lands.

10. The rivet fastener of claim 9, said channel having straight side walls, and said pin head having straight sides.

11. The rivet fastener of claim 9, said channel having curved side walls and said pin head having curved sides.

12. The rivet fastener of claim 9, said channel defined by a channel bottom and channel side walls; said pin head having a thickness profile corresponding to height profiles of said channel side walls; and said channel bottom having a relief area inwardly from at least one end of said channel.

13. A rivet fastener, comprising:
a fastener body having a body head, a plurality of legs extending from said head, a channel having a bottom and side walls defined in an outer surface of said head opposite said legs, and an opening from said bottom through said head;

lands positioned adjacent said channel, each of said lands defining a continuous unobstructed fingertip accommodating hollow therein extending continuously along said channel for the lengths of said lands;

a fastener pin having a shaft configured for insertion through said opening and a pin head at an end of said shaft; and said pin head having flat sides and a width between said flat sides to fit within said channel between said side walls.

14. The rivet fastener of claim 13, said pin head having a thickness profile corresponding to height profiles of said side walls.

15. The rivet fastener of claim 13, said channel bottom having relief areas at opposite ends thereof.

* * * * *